United States Patent [19]

Feres

[11] Patent Number: 5,254,219
[45] Date of Patent: Oct. 19, 1993

[54] FILM-TYPE EVAPORATOR

[76] Inventor: Vaclav Feres, 3002 Buena Vida Cir., Las Cruces 88001, N. Mex.

[21] Appl. No.: 848,931

[22] Filed: Mar. 10, 1992

[30] Foreign Application Priority Data

Mar. 12, 1991 [DE] Fed. Rep. of Germany ....... 4107844

[51] Int. Cl.⁵ ............................................. B01D 1/22
[52] U.S. Cl. .................................. 159/6.1; 159/28.1; 159/43.1; 159/49; 159/DIG. 41; 202/236; 203/89
[58] Field of Search ........................ 202/236, 238, 245; 203/89; 159/DIG. 41, 6.1, 28.1, 13.1, 43.1, 49, DIG. 32; 165/115, 88

[56] References Cited

U.S. PATENT DOCUMENTS

| | | | |
|---|---|---|---|
| 1,530,140 | 3/1925 | Schneible | 159/6.1 |
| 2,224,621 | 12/1940 | Voorhees | 159/6.1 |
| 3,127,250 | 3/1964 | Heinemann | 159/6.1 |
| 3,890,205 | 6/1975 | Schnitzer | 159/6.1 |
| 4,167,454 | 9/1979 | Ferea | 159/6.1 |
| 4,198,360 | 4/1980 | Shafranovsky et al. | 159/6.1 |
| 4,198,361 | 4/1980 | Shafranovsky et al. | 159/6.1 |
| 4,683,026 | 7/1987 | Feres | 159/6.1 |
| 4,707,220 | 11/1987 | Feres | 159/6.1 |

FOREIGN PATENT DOCUMENTS 1034585 7/1958 Fed. Rep. of Germany ....... 159/6.1
2134803 8/1984 United Kingdom ................ 159/6.1

Primary Examiner—Virginia Manoharan
Attorney, Agent, or Firm—Antonelli, Terry, Stout & Kraus

[57] ABSTRACT

Film-type evaporator for thickening liquid products with a container having a vapor outlet, a drive shaft introduced into the latter from above for a rotating rotor with at least one conically upwardly widening heating surface, onto whose inside the product is fed in the vicinity of the smaller diameter and the product spreads in film-like manner towards the larger diameter and is fed there as a concentrate into the container, and on whose outside is guided the heating medium supplied and removed through the hollow drive shaft. Such an evaporator is characterized in that in the vicinity of its larger diameter, the rotor is connected by a spider, which has at least one hollow arm in each case for the feed and removal of the heating medium, to the drive shaft, and in the vicinity of its smaller diameter is traversed by a conical immersion tube rotating with the rotor and which is immersed with its smaller diameter in the product or concentrate in the lower part of the container and on its larger diameter is connected to the drive shaft of the rotor and has there an overflow edge feeding the product or concentrate onto the heating surface.

12 Claims, 1 Drawing Sheet

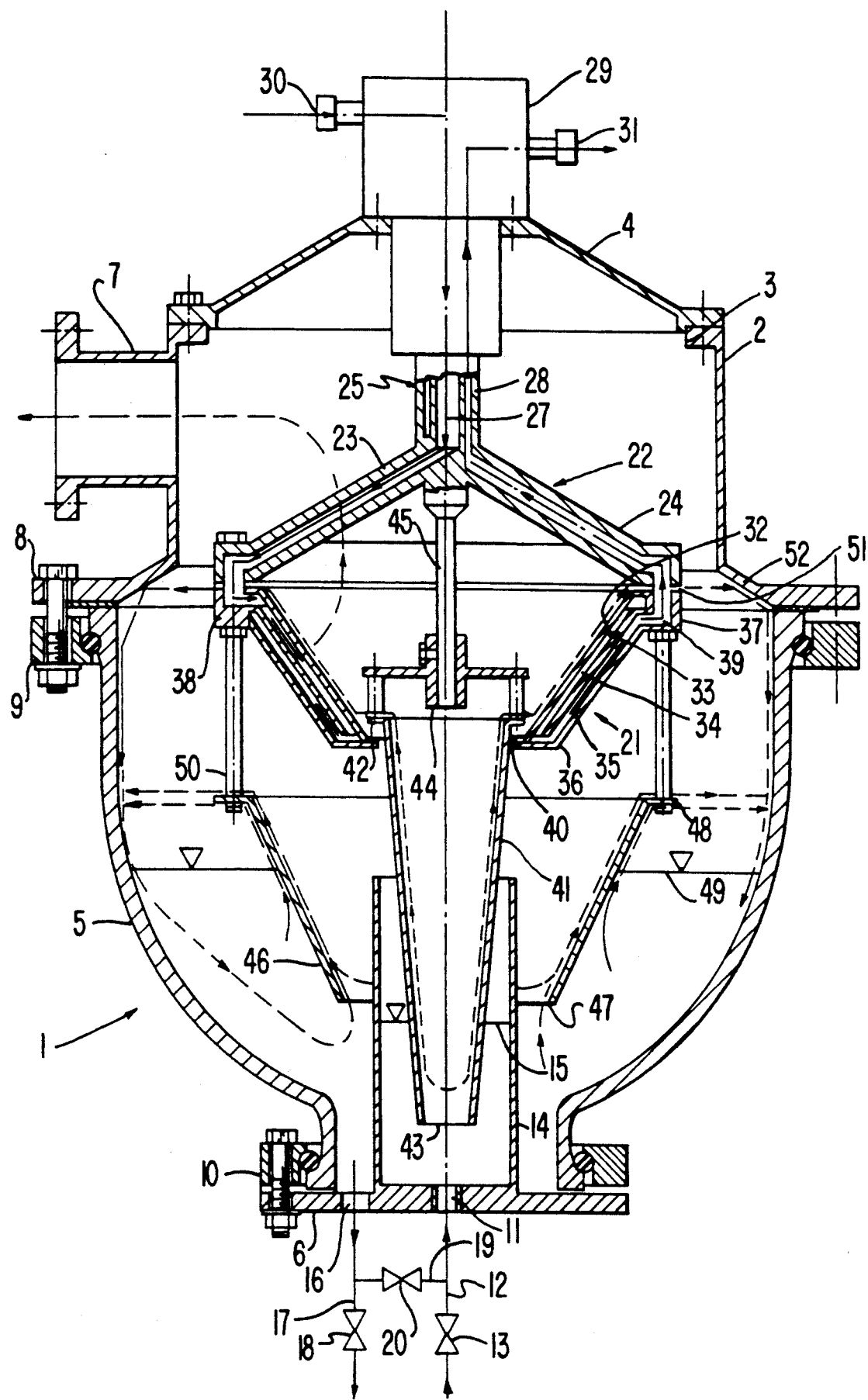

FILM-TYPE EVAPORATOR

BACKGROUND AND SUMMARY OF THE INVENTION

The invention relates to a film-type evaporator for thickening liquid products with a container having a vapor outlet, a drive shaft introduced into the latter from above for a rotating rotor with at least one conically upwardly widening heating surface, onto whose inside the product is fed in the vicinity of the smaller diameter and the product spreads in film-like manner towards the larger diameter and is fed there as a concentrate into the container, and on whose outside is guided the heating medium supplied and removed through the hollow drive shaft.

Film-type evaporators having the aforementioned construction operate according to the centrifugal principle, in that the product is fed onto rapidly rotating, axially symmetrical heating surfaces, which are heated with liquid or vaporous heat carriers. As a result of their conical or tapered construction, said heating surfaces have a more or less pronounced slope or taper with respect to a radial plane, so that the product fed close to the axis spreads in film-like manner to the outside. Within the film there is largely a laminar flow, which once again leads to a purely surface evaporation. As a result of the high heat transmission coefficient ($kcal/m^2/h°C$), the circulation residence time of the product on the heating surface can be kept short, i.e. a few seconds. Therefore the film-type evaporator makes it possible to evaporate the product in a very careful manner. Therefore in the case of many heat-sensitive products, as well as highly viscous products (up to 50,000 cP), it often constitutes the only distillation or concentration possibility.

Another advantage of thin film evaporation with rotating heating surfaces results from the fact that the liquid film is always pressed onto the heating surface due to the centrifugal forces. As a result bubble and froth formation is suppressed, so that film-type evaporators are particularly suitable for the processing of products having a froth or foam formation tendency.

Single-stage or multistage film-type evaporators exist. With the multistage construction, the concentrate obtained on the outer circumference of the heating surface in the first evaporation stage is fed onto at least one further heating surface of a second evaporation stage, where it undergoes further concentration.

Very high evaporation rates, which not infrequently exceed 90% of the liquid content in the starting product, cannot be achieved in the case of single-stage evaporation. However, with a multistage construction, a considerable constructional expenditure occurs and a significant contribution thereto is made by the high dynamic loads resulting from high speeds and the necessarily thin-walled heating surfaces. Thus, in such cases, it is still very frequent to work with closed reboilers.

The problem of the invention is to so construct a film-type evaporator that maximum evaporation rates can be achieved with minimum constructional expenditure.

On the basis of the film-type evaporator defined hereinbefore, this problem is solved in that in the vicinity of its larger diameter, the rotor is connected by means of a spider, which has at least one hollow arm in each case for the feed and removal of the heating medium, to the drive shaft, and in the vicinity of its smaller diameter is traversed by a conical immersion tube rotating with the rotor and which is immersed with its smaller diameter in the product or concentrate in the lower part of the container and on its larger diameter is connected to the drive shaft of the rotor and has there an overflow edge feeding the product or concentrate onto the heating surface.

Apart from the rotary, conical heating surface, the inventively constructed film-type evaporator has a co-rotating pump in the form of an immersion tube pump, which can suck in the product or the concentrate collecting in the lower part of the container, or a mixture thereof and supply same to the heating surface. Thus, the evaporator can operate in the singlepass process or in the circulation process. In the case of the former, the product is sucked out of the lower part of the container by means of the immersion tube pump and fed onto the heating surface on which it is distributed in the form of a film. The concentrate collecting on the outer circumference of the heating surface is sprayed into the container and collects in its lower part from where it can be removed. With a circulation process in order to bring about a high concentration or thickening, the concentrate collecting in the lower part is supplied to the immersion tube pump and by the latter back to the heating surface. A specific filling level in the lower part will be ensured. Through a plurality of circulations the concentration can be brought to the desired level. A continuous operation is also possible, in that a specific small concentrate quantity is constantly removed and replaced by a fresh product quantity adapted thereto and to the evaporated quantity.

According to a preferred construction, the immersion tube engages with its smaller diameter in an upwardly open chamber arranged in the lower part of the container and which is connected to a product feed line and can optionally be connected to a concentrate drain of the container.

In this embodiment a specific filling level for the supplied product or the returned concentrate can be set in the chamber and therefore on the suction side of the immersion tube, so as in this way to ensure that the same evaporation ratios always exist on the heating surface. The chamber also ensures a separation of the concentrate collecting in the lower part from the liquid fed in (fresh product or preconcentrate).

If the immersion tube is axially adjustable on the drive shaft, there is a simple possibility for regulating the quantity supplied to the heating surface in the case of a given rotor speed or for maintaining the quantity constant when the speed varies (modification of the product residence time on the heating surface).

According to a further preferred development of the invention, a further conical, outer immersion tube is provided, which spacedly surrounds the chamber in the vicinity of its smaller diameter and is immersed in the concentrate collecting in the lower part and which in the vicinity of its larger diameter is connected to the rotor and has an overflow edge positioned above the concentrate level.

The additional outer immersion tube acts as a type of mixer for the concentrate collecting in the lower part, in that it ensures a constant circulation. The concentrate sprayed on the outer heating surface circumference runs downwards on the container inner walls into the concentrate supply in the lower part of the container. From the latter is constantly sucked a specific quantity on the lower edge of the outer suction tube, which is transported upwards and sprayed on the overflow edge above the liquid level into the container. Thus, there is already a mixing on the container inner wall, in that the concentrate sprayed on the overflow edge of the outer immersion tube meets the concentrate sprayed by the heating surface and running down the inner container wall. As a result of the constant circulatory movement, there is a homogenization and degassing of the concentrate in the lower part of the container.

Partial or complete circulation operation can most easily be brought about in that the product feed line is connected to the concentrate drain line by means of a bypass with a valve.

A constructionally simple drive coupling between the rotor and outer immersion tube is obtained in that the outer immersion tube immersed in the concentrate is connected by means of stay bolts with the outer rotor circumference.

A similar simple drive coupling for the inner immersion tube is obtained if the latter is connected in the vicinity of the overflow edge by means of stay bolts to a sliding collar or sleeve, which is located on an extension of the drive shaft projecting into the rotor.

The supply and removal of the heat carrier can be constructionally achieved in that the rotor comprises three concentric, conical walls, whereof the axially inner wall forms the heating surface and together with the middle wall defines a heating chamber for the heating medium, whilst the middle wall and the outer wall form a chamber for the return of the heating medium, the heating chamber being connected on the outer circumference of the rotor with the arms of the spider supplying the heating medium and on the inner circumference with the chamber returning the heating medium, which is in turn connected to the corresponding arms of the spider.

In the aforementioned construction the hollow drive shaft, which is known per se from the prior art, and the hollow arms of the spider are used not only for the transmission of the torque to the rotor, but also for supplying and removing the liquid or vaporous heat carrier.

In this rotor construction it is appropriate for the heating surface of the rotor to have between the arms of the spider a draining edge for the concentrate and that in the container, level with the draining edge of the heating surface, there is provided a downwardly and outwardly sloping spray protection means. The latter ensures that the concentrate sprayed on the heating surface outer edge is not splashed within the container and entrained with the vapours and is instead converted on the container wall into a film, which under the action of gravity drains into the lower part. The spray protection means can be formed by a correspondingly inclined part of the container wall.

Advantageously the container has a removable cover or lid, with which the rotor and the immersion tubes are connected by means of the drive shaft and the mounting support thereof and that the cover closes an opening in the container whose diameter is larger than that of the rotor or the outer immersion tube.

In this embodiment the functional parts of the film-type evaporator are fitted to the cover, so that they can be lifted therewith out of the container. Thus, maintenance, repair and cleaning work can be carried out particularly easily.

This objective is also achieved by the fact that the container has a base, which is roughly centrally connected to the product feed line and to which the chamber is fixed and which outside the latter is connected to the concentrate drain line.

BRIEF DESCRIPTION OF THE DRAWINGS

The invention is described in greater detail hereinafter relative to an embodiment shown in axial section in the single drawing.

DETAILED DESCRIPTION OF PREFERRED EMBODIMENT

The film-type evaporator shown in the drawing has a container 1, which comprises an upper part 2 with an opening 3 and a cover 4 closing the same, as well as a lower part 5 and a base 6. The upper part 2 and lower part 5 can in each case be made from any appropriate material. When used for laboratory purposes, in the manner shown, at least the lower part 5 should be made from glass.

The upper part 2 of the container 1 has a vapor outlet 7 and is screwed to the lower part 5 by means of a cap flange 9 and a flange 8 in one piece therewith. In the same way the base 6 is connected to the lower part 5 by means of a cap flange 10. The base has a product feed 11, to which is connected a product line 12 with a valve 13. The product feed 11 issues into a tubular chamber 14, in which is maintained a specific liquid level 15. Alongside the chamber 14, the base 6 also has a concentrate drain 16, to which is connected a concentrate drain line 17 with a valve 18. The concentrate drain line 17 and the product feed line 12 are connected by means of a bypass 19 with a valve 20.

The container 1 contains a rotor 21, which is connected to a drive shaft 25 by means of a multiarm spider 22, whereof the arms 23 and 24 can be seen. As a rule, there will be a total of four support arms. The drive shaft 25 is mounted in a casing fixed to the container cover 4 and has two concentric bores 27,28, which are in turn connected to a distributing head 29 with a heat carrier feed 30 and a heat carrier drain 31. The heat carrier feed 30 is connected to the inner bore 27 of the drive shaft and the latter to the hollow arm 23 of the spider. The heat carrier drain 31 is connected to the outer bore 28 of the drive shaft and the latter is connected to the other hollow arm 24 of the spider.

The rotor comprises three axially symmetrical, concentric, conical surfaces, whereof the inner surface forms a heating surface 32, which together with a central partition 33 defines a heating chamber 34, the latter is connected in the vicinity of the smaller diameter of the rotor 21 to a chamber 35, which is defined by the partition 33 and an outer wall 36. On its outer circumference the rotor 21 has a flange 37, which has two separate channels 38 and 39. The channel 38 is connected by means of an axially parallel bore to the hollow support arm 23 and the channel 39 by means of an axially parallel bore to the hollow support arm 24.

The liquid or vaporous heat carrier flows from the feed 30 via the inner bore 27 of the drive shaft 25, the hollow arm 23 of the spider 22 and the channel 38 into the heating chamber 34 and gives off its heat to the heating surface 32. The heat carrier then passes into the chamber 35 and is passed from there via the channel 39, the hollow support arm 24 and the outer bore 28 to the heat carrier drain 31.

In the vicinity of its smaller diameter or at its lower end, the rotor 21 has an opening 40, in which engages an inner, conical immersion tube 41 with its larger diameter and which at this point has an overflow edge 42. By means of its lower, smaller diameter end 43 the immersion tube 41 projects into the chamber 14. At its overflow edge 42, the immersion tube 41 is connected by means of a few stay bolts to a sliding collar 44, which is in turn displaceably fixed on an extension 45 of the drive shaft 25 projecting into the rotor 21.

In the lower part 5 of the container 1 is located an outer, conical immersion tube 46, which surrounds with radial spacing the chamber 14 and the inner immersion tube 41. The lower, smaller diameter end 47 of the immersion tube 46 is located in the liquid collecting in the lower part, whilst its upper end has an overflow edge 48, which is above the level 49 of said liquid. The outer immersion tube 46 is also indirectly connected to the drive shaft 25 using stay bolts 50, which are fixed on the one hand to the overflow edge 48 and on the other to the flange 37 of the rotor 21. Therefore the rotor 21, the inner immersion tube 41 and the outer immersion tube 46 rotate at the same speed. The present filmtype evaporator allows the following operating modes.

It is firstly pointed out that in each operating mode a clearly defined liquid level 15 must be maintained within the chamber 14. Moreover, as stated hereinbefore, the heat carrier circuit is the same in each operating mode.

In the single-pass process the valve 20 in the bypass 19 is closed, whereas the valves 13 and 18 are open. The product passes via the feed 11 into the chamber 14 and is sucked from there by the inner immersion tube 41, which feeds the product upwards until it reaches the overflow edge 42. It is then sprayed radially onto the heating surface 32, on which it rises upwards and outwards in film-like manner. The evaporating liquid is sucked off by means of the vapour outlet 7. On the outer circumference of the heating surface the concentrate passes onto an all-round draining edge 51 only broken by the arms 23,24 of the spider 22 and from which the concentrate is radially sprayed. In the plane of the draining edge 51 is provided an outwardly and downwardly inclined spray protection means 52, which is formed by an inclined surface on the upper part 2 of the container 1 and prevents any splashing of concentrate in the container. The concentrate runs down the inner container wall, particularly of the lower part 5 and is drawn off by means of the concentrate drain 16 and the drain line 17.

In the circulation process the valve 18 in the drain line 17 is either completely (complete circulation) or partly (partial circulation) closed, whereas the valve 20 in the bypass 19 is open. With the valve 13 open and the valve 18 closed, the feed line 12 feeds product until the liquid level 49 in the lower part is reached. The product is supplied in the above-described manner for evaporation, but the concentrate collects gradually in the lower part 5 and on reaching the lower edge 47 of the outer immersion tube 46 is sucked by the same, conveyed upwards and sprayed over the overflow edge 48 back into the lower part, where it is degassed mixed with the concentrate flowing down from above and is continuously circulated therewith. As in addition the concentrate is constantly passed via the open bypass 19 and the feed 11 into the suction area of the inner immersion tube 41, an increasingly concentrated product is supplied to the heating surface. When the product in the lower part 5 has reached the desired concentration, it can be completely drained off by opening the valve 18. In place of this discontinuous operation, a continuous operation with partial circulation is also possible. In the latter, after reaching the desired concentration in the lower part 5, the valve 18 is partly opened and a small concentrate quantity is constantly removed. This partial quantity is continuously replaced by a partial fresh product quantity, which is larger by the evaporation rate and with the valve 13 partly opened.

I claim:

1. A film-type evaporator for thickening liquid products comprising a container having a vapor outlet, a hollow drive shaft introduced into the container from above, said hollow drive shaft including means for supplying and removing a heating medium through said shaft, a rotor in said container, said rotor being rotated by said drive shaft, and said rotating rotor having at least one conically upwardly widening heating surface, means for feeding a liquid product to an inside surface of the at least one heating surface in the vicinity of a smaller diameter thereof, the product spreading in film-like manner towards a larger diameter thereof and means for feeding the liquid product as a concentrate from a larger diameter of the at least one heating surface into the container, means for guiding the heating medium supplied and removed through said hollow drive shaft on the outside of said at least one heating surface, a spider connected to the hollow drive shaft in the vicinity of the larger diameter of said rotor, said spider having at least one hollow arm for the feeding and at least one hollow arm for the removal of the heating medium, a conical inner immersion tube of said means for feeding a liquid, said conical inner immersion tube transversing said rotor in the vicinity of the smaller diameter of said rotor, said conical inner immersion tube rotating with the rotor and being immersed with its smaller diameter in a liquid product or concentrate in the lower part of the container and on its larger diameter is connected to the hollow drive shaft of the rotor, said conical inner immersion tube having an overflow edge on its larger diameter for feeding the liquid product or concentrate onto the at least one heating surface.

2. The film-type evaporator according to claim 1, including means defining an upwardly open chamber located in the lower part of the container, the smaller diameter of the immersion tube being placed in the upwardly open chamber, a product feed line being connected to said chamber, and means for connecting said chamber to a container concentrate drain line.

3. The film-type evaporator according to claim 1, including means for axially adjusting the immersion tube on the 4. The film-type evaporator according to claim 2, wherein a further conical, outer immersion tube is provided, which in its smaller diameter region spacedly surrounds the chamber and is immersed in liquid concentrate collected in the lower part of the container and which in its larger diameter region is connected to the rotor and has an overflow edge positioned above liquid concentrate level in the lower part of the container.

5. A film-type evaporator according to claim 2, wherein the product feed line is connected to the concentrate drain line by means of a bypass with a valve.

6. A film-type evaporator according to claim 2, wherein the container has a base, which is connected roughly centrally to the product feed line and to which is fixed means defining the chamber and which is connected outside the said chamber to the concentrate drain line.

7. A film-type evaporator according to claim 4, wherein the outer immersion tube immersed in the concentrate is connected by means of stay bolts to the outer circumference of the rotor.

8. A film-type evaporator according to claim 4, wherein the container has a removable cover, to which the rotor and immersion tubes are connected by means of the drive shaft and its mounting support and that the cover closes an opening in the container whose diameter is larger than the largest diameter of the rotor or the outer immersion tube.

9. A film-type evaporator according to claim 1, wherein in the vicinity of the overflow edge, the inner immersion tube is connected by means of stay bolts to a sliding collar, which is located on an extension of the drive shaft projecting into the rotor.

10. A film-type evaporator according to claim 1, wherein the at least one conically upwardly widening heating surface comprises three concentric, conical walls, whereof the axially inner wall forms the at least one heating surface and together with the middle wall bounds a heating chamber as said means for guiding the heating medium on the outside of the at least one heating surface, while the middle wall and the outer wall form a chamber for the return of the heating medium, the heating chamber being connected on the outer circumference of the rotor with the arms of the spider supplying the heating medium and on the inner circumference with the chamber returning the heating medium, which is in turn connected to the corresponding arms of the spider.

11. A film-type evaporator according to claim 1, wherein said means for feeding the liquid product as a concentrate from a large diameter of the heating surface includes between the arms of the spider and the heating surface includes between the arms of the spider and the heating surface a draining edge for the concentrate and in the container, level with the draining edge of the heating surface, is provided a downwardly and outwardly sloping spray protection means.

12. A film-type evaporator according to claim 11, wherein the spray protection means is part of a wall of the container.

* * * * *